(12) United States Patent
Schen et al.

(10) Patent No.: US 11,834,944 B2
(45) Date of Patent: Dec. 5, 2023

(54) DOWNHOLE ELECTRONICS PUCK AND RETENTION, INSTALLATION AND REMOVAL METHODS

(71) Applicant: National Oilwell Varco, L.P., Houston, TX (US)

(72) Inventors: Aaron Schen, Houston, TX (US); Jacob Riddel, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 79 days.

(21) Appl. No.: 17/628,046

(22) PCT Filed: Jun. 2, 2020

(86) PCT No.: PCT/US2020/035690
§ 371 (c)(1),
(2) Date: Jan. 18, 2022

(87) PCT Pub. No.: WO2021/015855
PCT Pub. Date: Jan. 28, 2021

(65) Prior Publication Data
US 2022/0243579 A1 Aug. 4, 2022

Related U.S. Application Data

(60) Provisional application No. 62/878,186, filed on Jul. 24, 2019.

(51) Int. Cl.
*E21B 47/017* (2012.01)
*E21B 47/01* (2012.01)

(52) U.S. Cl.
CPC ............ *E21B 47/017* (2020.05); *E21B 47/01* (2013.01); *E21B 2200/01* (2020.05)

(58) Field of Classification Search
CPC .................................................. E21B 2200/01
See application file for complete search history.

(56) References Cited

U.S. PATENT DOCUMENTS 5,061,849 A * 10/1991 Meisner .................... G01V 5/12
250/254
6,466,513 B1 * 10/2002 Pabon ..................... B06B 1/067
181/105

(Continued)

OTHER PUBLICATIONS

International Patent Application No. PCT/US2020/035690 International Search Report and Written Opinion dated Nov. 5, 2020 (15 pages).

*Primary Examiner* — Tara Schimpf
*Assistant Examiner* — Yanick A Akaragwe
(74) *Attorney, Agent, or Firm* — Conley Rose, P.C.

(57) ABSTRACT

An electronics module or "puck" is positioned in a recess formed in the outer surface of a downhole tool. The puck body includes a flange segment having a first outer diameter, and an adjacent seal-engaging segment having an outer diameter that is less than the outer diameter of the flange segment. An annular seal is disposed about the seal-engaging segment and seals between the puck and the perimeter wall of the recess. A cover ring is disposed over an intermediate segment of the puck body, capturing the seal between the cover and the flange segment. A retainer ring is employed to selectively engage and disengage the perimeter wall of the recess, retaining the puck, seal and covering ring in the recess. A method for installation and removal of the puck is disclosed.

22 Claims, 6 Drawing Sheets

(56) References Cited

U.S. PATENT DOCUMENTS

| | | | |
|---|---|---|---|
| 2005/0000279 A1 | 1/2005 | Yogeswaren | |
| 2006/0065395 A1* | 3/2006 | Snell | E21B 47/01 |
| | | | 175/45 |
| 2011/0073368 A1* | 3/2011 | Han | G01V 1/46 |
| | | | 367/25 |
| 2015/0090495 A1* | 4/2015 | McGinnis | E21B 47/07 |
| | | | 175/40 |
| 2015/0285055 A1 | 10/2015 | Anderson et al. | |
| 2015/0330208 A1 | 11/2015 | Haubold et al. | |
| 2015/0337644 A1 | 11/2015 | Mueller et al. | |
| 2019/0218877 A1* | 7/2019 | Pan | E21B 33/037 |
| 2020/0208507 A1* | 7/2020 | Du | E21B 17/16 |
| 2022/0034218 A1* | 2/2022 | Evans | E21B 47/13 |

* cited by examiner

DOWNHOLE ELECTRONICS PUCK AND RETENTION, INSTALLATION AND REMOVAL METHODS

CROSS-REFERENCE TO RELATED APPLICATIONS

This application is a National Phase Entry into the U.S. under 35 U.S.C. of and claims priority to PCI plication No. PCT/US2020/035690, filed Jun. 2, 2020, entitled "Downhole Electronics Puck and Retention, Installation and Removal Methods," which claims benefit of U.S. provisional patent application Ser. No. 62/878,186, filed Jul. 24, 2019, and entitled "Downhole Electronics Puck and Retention, Installation and Removal Methods," the entire contents of each being incorporated herein by reference for all purposes.

STATEMENT REGARDING FEDERALLY SPONSORED RESEARCH OR DEVELOPMENT

Not applicable.

BACKGROUND

This disclosure relates generally to tools and systems used in the recovery of underground petroleum resources. More particularly, the disclosure relates to downhole tools used in drilling processes and, still more particularly, to electronic modules or "pucks" that are disposed in pockets of downhole tools and used to gather drilling dynamics and other valuable data.

There are a variety of puck-style electronic tools. Pucks are typically installed in a recess or pocket formed on the outer surface of a drilling tool or component. Such positioning enables convenient and quick access to the puck once the drill run has been completed and the tool pulled from the borehole. Most of these pucks are large enough that they can be installed in a tool body with threads; however, in smaller sizes, a threaded engagement is difficult or not a viable option. For some of these smaller pucks, features have been made for slide hammers or removal tools that attach to the puck and thereby provide a method of applying an extraction force, such as a screw jack. In existing designs, the seals have to be installed first, which has made installation difficult in part because the trapped air beneath the seals tends to push against and resist the installation of the puck. Further, removal of the puck in the case of existing designs frequently requires high forces and often requires the design and implantation of special tools.

BRIEF SUMMARY OF THE DISCLOSURE

Addressing various shortcomings in the prior art, there is disclosed a downhole tool configured to be disposed in a borehole having borehole fluids, the tool including: a tool body comprising an outer surface configured for exposure to borehole fluids and a recess in the outer surface, the recess including a perimeter wall and a recess opening; and an electronics module positioned in the recess. The module comprises a body that houses electronic devices that are retained within a cavity internal to the body. The module body comprises: a flange segment having a first outer diameter; a seal-engaging segment having an outer diameter that is less than the outer diameter of the flange segment; and a first annular shoulder between the flange segment and the seal-engaging segment. The tool further includes a retainer comprising a wall-engaging outer surface configured to selectively engage and disengage the perimeter wall of the recess; and an annular seal disposed about the seal-engaging segment between the retainer and the first annular shoulder of the module body and sealing between the module body and the perimeter wall of the recess.

The module body may further include an intermediate segment, an end segment, and a second annular shoulder between the intermediate segment and the seal engaging segment; where the downhole tool further comprises an annular cover engaging the second annular shoulder and comprising a cover opening, wherein the intermediate segment of the module body extends through the cover opening.

The outer diameter of the retainer may exceed the outer diameter of the first annular shoulder and exceed the outer diameter of the cover. Further, in some embodiments, the retainer is positioned so as to be in engagement with the cover.

In some embodiments, the retainer further comprises a retainer opening, and wherein the end segment of the module body extends into the retainer opening. The retainer may be a spring-loaded retaining ring. In some embodiments, the perimeter wall of the recess includes an annular groove, wherein the wall-engaging outer surface of the retainer is disposed in the annular groove.

In some embodiments, the cover opening is defined by a circumferential edge, wherein the edge comprises one or more tool receiving features.

In some embodiments, the module body is threadless on its outer surface, and in some embodiments, the perimeter sidewall of the recess is also threadless.

In some embodiments, a seal gland is defined by the cover, the seal-engaging segment, the flange segment, and the perimeter wall of the recess, and wherein a back up annular member is positioned in the seal gland between the first annular shoulder and the annular seal.

In some embodiments, the intermediate segment has an outer diameter that is less than the outer diameter of the seal-engaging segment, and wherein the end segment has an outer diameter that is less than the outer diameter of the intermediate segment. The module body may include a third annular shoulder between the intermediate segment and the end segment, and the retainer is in engagement with the third annual shoulder in some embodiments.

In some embodiments, the retainer is a spring-loaded retaining ring having a retainer opening, and wherein the retainer opening has a diameter that is less than the outer diameter of the intermediate segment and is greater than the outer diameter of the end segment. Further, in some embodiments, the retainer has an outer diameter that is greater than the outer diameter of the cover.

A method of installing or removing an electronics module within a recess formed in the outer surface of a downhole tool is also disclosed and includes: positioning the module in the recess, the recess having a perimeter sidewall; positioning an annular seal about the module after the module is positioned in the recess; after positioning the annular seal about the module, positioning a cover having a cover opening within the recess such that a segment of the module extends through the cover opening; and after positioning the cover, positioning within the recess a retainer such that the outer surface of the retainer releasably engages the perimeter wall of the recess.

In some embodiments, positioning an annular seal about the module is performed using a tool having an annular extension, the annular extension being used to press the annual seal in a direction away from the recess opening and into sealing engagement with the perimeter wall of the recess and the module. In some embodiments, the retainer is a spring loaded ring, and wherein the positioning of the retainer in the recess comprises actuating the ring to cause the ring to expand from a compressed position to an expanded position, the outer edges of the ring engaging the perimeter wall of the recess upon expansion of the ring.

Further, the method may further include: removing the retainer from the recess; and, using a tool, engaging a tool-engaging feature of the cover with the tool and prying a segment of the cover away from the module.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. The specific embodiments disclosed may be readily utilized as a basis for modifying or designing other structures for carrying out the same purposes as the disclosed embodiments. Such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF THE DISCLOSED EXEMPLARY EMBODIMENTS

Figure 1:
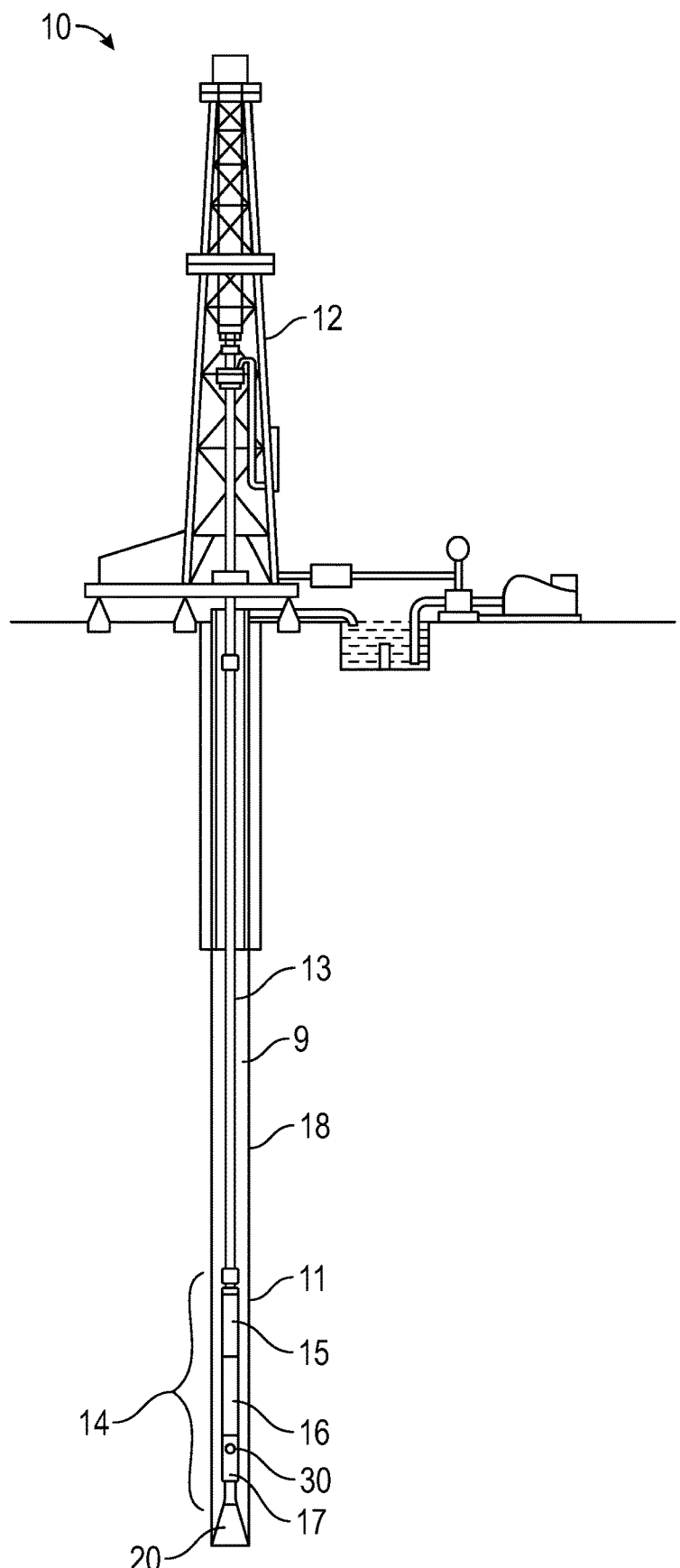
FIG. 1 is a schematic, partial cross-sectional, view of a drilling system that includes various downhole tools and an electronics puck retained in one of said downhole tools, the puck and its retention system made in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

The drawing Figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Also, the term "couple" or "couples" is intended to mean either an indirect or direct connection. Thus, if a first device couples to a second device, that connection may be through a direct engagement between the two devices, or through an indirect connection established via other intermediate devices, components, nodes and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

Well System

Referring now to FIG. 1, a well system 10 for drilling a borehole 11 in an earthen formation is shown. In this embodiment, well system 10 includes a drilling rig 12 disposed at the surface, a drill string 13 extending downhole from rig 12 in hole 11, a bottomhole assembly (BHA) 14 coupled to the lower end of drillstring 13, and a drill bit 8 attached to the lower end of BHA 14. In this embodiment, BHA 14 includes an instrumentation sub 15, a downhole mud motor 16 and a measurement-while-drilling (MWD) tool 17 for facilitating the drilling of deviated portions of borehole 11. In some embodiments, BHA 14 may include other components, such as drill collars, reamers, stabilizers and the like. In the embodiment of FIG. 1, one or more components of BHA 14, such as MWD tool 17, includes an electronics puck 30 retained in a wall of the tool, as best described with reference to the larger view shown in FIG. 2. It should be understood that although features and principles of the invention are described with reference to a specific downhole tool, such as MWD 17 tool, it is to be understood that the puck 30 and its retention means and installation and removal apparatus and methods are all equally applicable to any downhole tool, such that any reference to tool 17 or MWD tool 17 equally applies to any downhole tool.

Downhole Tool

Figure 2:
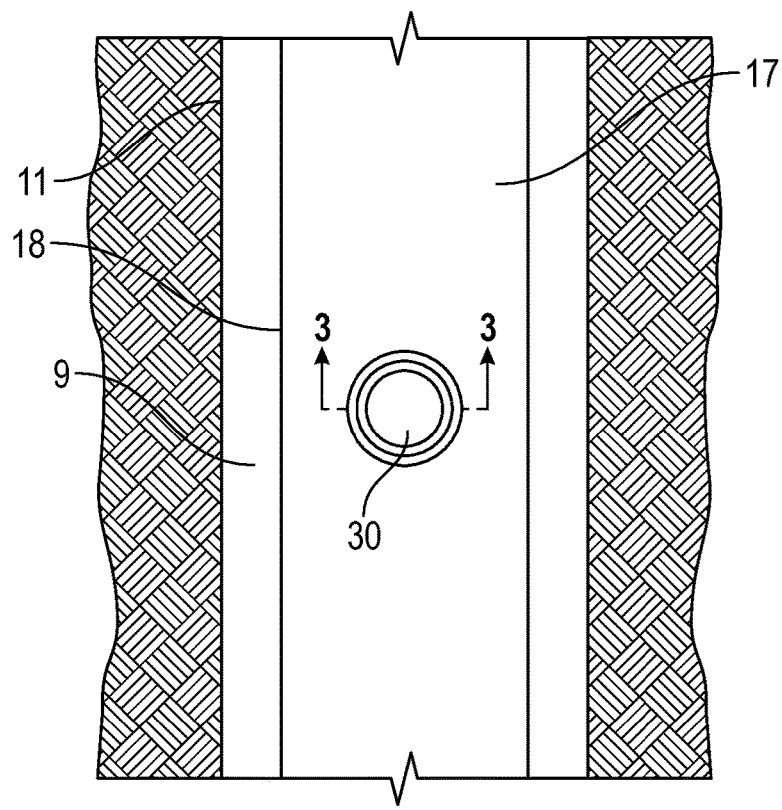
FIG. 2 is an enlarged view of a portion of a downhole tool shown in FIG. 1 having the electronics puck retained therein.
Figure 3:
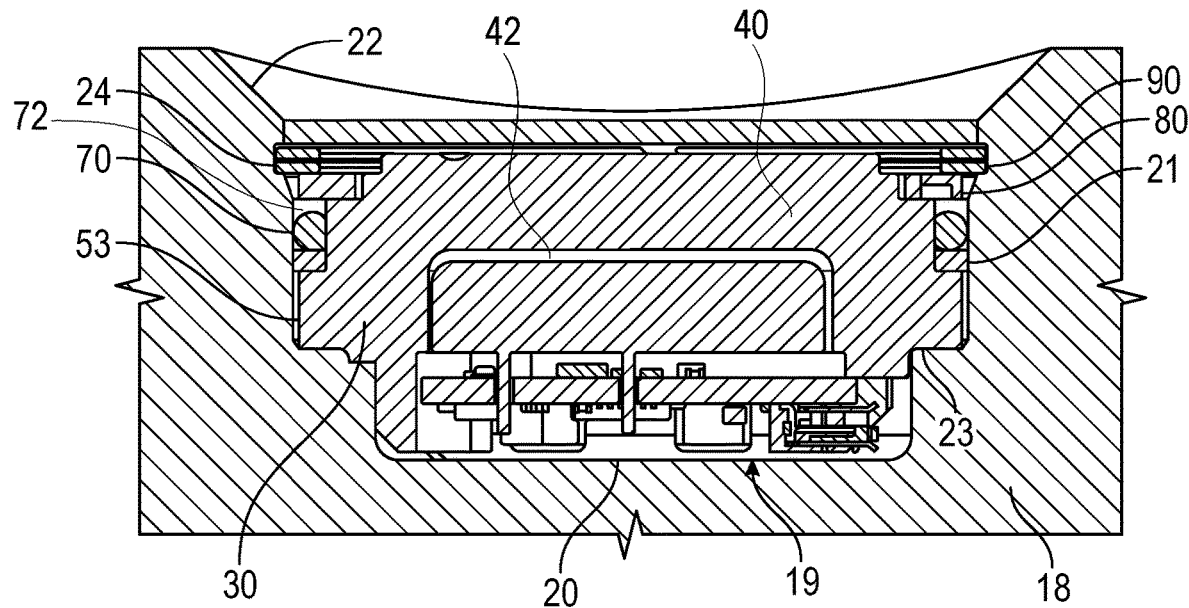
FIG. 3 is a cross sectional view showing the electronics puck and the retention system retaining the puck within the tool shown in FIG. 2, the cross section taken along line 3-3 of FIG. 2.

Referring now to FIGS. 2 and 3, downhole tool 17 includes a generally cylindrical body having an outer wall 18 with a circular pocket or recess 19 formed into the outer surface of wall 18. Recess 19 is open to the annulus 9 that exists between the BHA 14 and the wall of borehole 11. In this embodiment, recess 19 includes a generally planar bottom surface 20, a circumferential perimeter sidewall 21 and a recess opening 22. In this embodiment, perimeter sidewall 21 is free of threaded segments. Perimeter sidewall includes an annular groove 24 and an annular ledge 23. Collective, as best shown in FIG. 3, these features provide recess 19 and sidewall 21 with a stepped profile 26 that surrounds puck 30. Puck 30 is disposed in recess 19 and rests against bottom surface 20, puck 30 being retained in this position in recess 19 by apparatus and features described more fully below.

Electronics Puck

Puck 30 is an integrated electronics package or module that houses a variety of sensors, transducers, antennae, and associated circuitry. In some embodiments, puck 30 includes features in common with the electronics packages and sensor assemblies described in U.S. Pat. No. 8,487,626, which is incorporated herein by reference for all of its teachings. Puck 30 may include sensors to perform reliability checks on the downhole tools and, in such applications, will serve as a downhole reliability monitor (DRM). As used herein, the term "puck" is used to mean and refer to any electronics module that is configured to be employed in a downhole tool where it will be exposed to the fluids and the pressures that exist within a wellbore.

Figure 4:
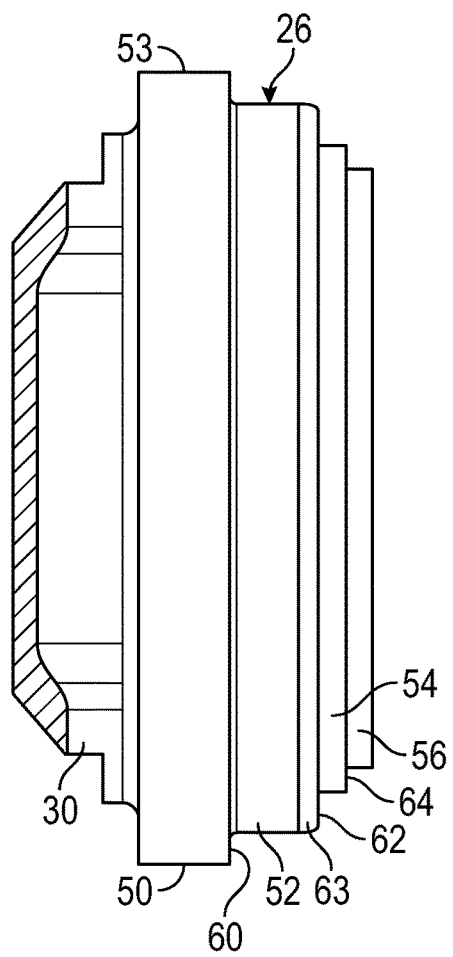
FIG. 4 is an enlarged elevation view of the electronics puck shown in FIG. 3, with the puck shown removed from the tool.

As shown in FIGS. 3 and 4, puck 30 includes a body 40 having an internal cavity 42, the body 40 surrounding and housing the electronic components. Body 40 is open at the surface adjacent bottom surface 20 of recess 19 and, consequently, the recess 19 must be sealed from wellbore fluids so that the fluids do not come in contact with the electronic components retained within body 40. The components and features achieving the seal are described below. As best shown in FIG. 4, puck body 40 includes a series of connected body segments including flange segment 50, seal-engaging segment 52, intermediate segment 54, and end segment 56. Seal-engaging segment 52 includes a sealing surface 53. An annular shoulder 60 separates flange segment 50 and seal-engaging segment 52. A second annular shoulder 62 separates seal-engaging segment 52 and intermediate segment 54. Shoulder 62 includes a lead in chamfer 63 which, as described more fully below, facilitates the installation of an annular seal, such as O-ring seal 70 over shoulder 62 where it sealingly engages sealing surface 53 of puck body 40 and perimeter wall 21 of the recess 19. A third annular shoulder 64 separates intermediate segment 54 and end segment 56. Each segment 50, 52, 54 and 56 has a generally cylindrical outer surface. The outer diameter of flange segment 50 is greater than the outer diameter of seal-engaging segment 52. Likewise, seal-engaging segment 52 has a larger outer diameter than intermediate segment 54 which, in turn has a larger outer diameter than end segment 56. In this arrangement, as best shown in the elevation or profile view of FIG. 4, the outer profile of puck 30 has a stair step configuration and, notably, the overall outer diameter and footprint of puck 30 is defined by the outer diameter of flange segment 50 in this embodiment. In the exemplary embodiment disclosed in FIGS. 3 and 4, body 40 and each of its segments 50, 52, 54, 56 is free of threaded regions, and therefore may be described as threadless. In certain embodiments of a downhole tool 17, for example a downhole tool having an overall diameter of 5 inches, puck 30 may have an outer diameter of about 1.6 inches. In another embodiment, such as a downhole tool have a diameter of 8 inches, puck 30 may have an overall diameter 2½ inches. Although the dimensions of these very specific examples have been provided, it is to be understood that the features and principles of operation described herein may be applied to downhole tools of any size.

Annular Seal

Figure 7:
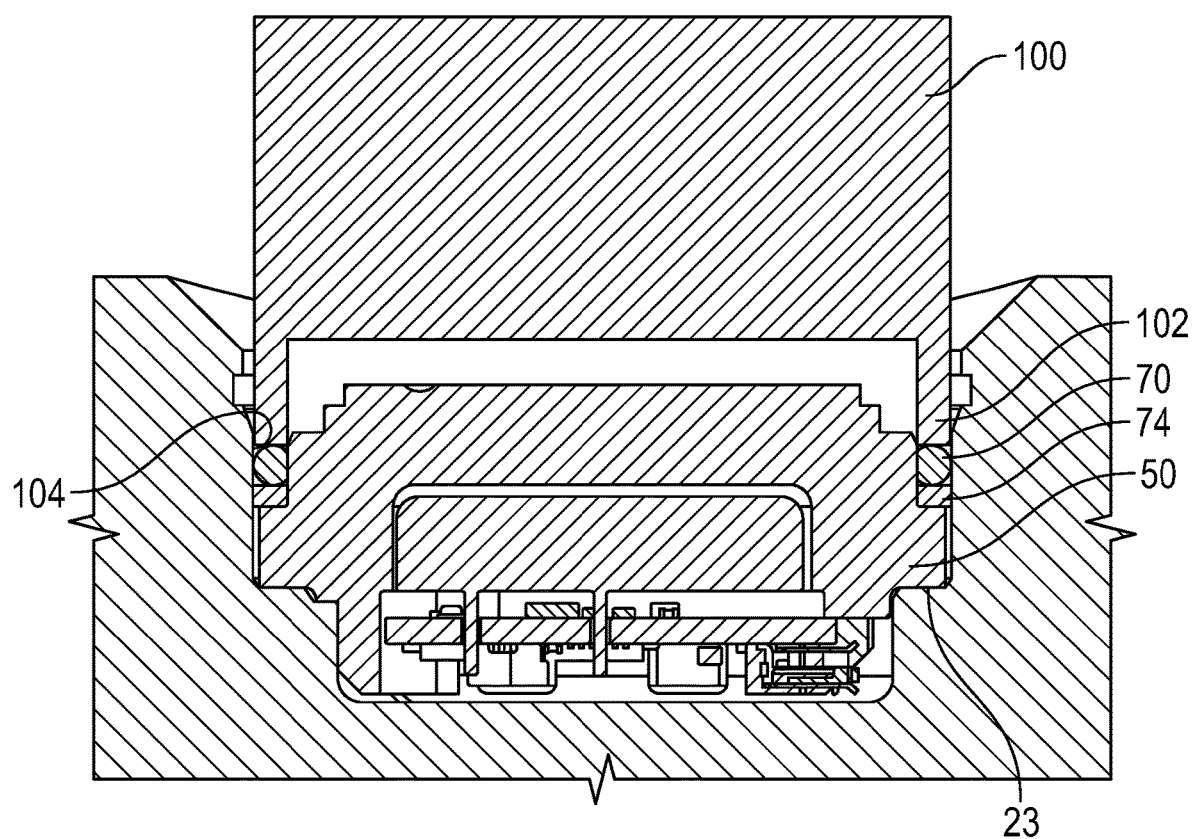
FIG. 7 is a cross sectional view showing a portion of the installation method disclosed herein.

In the embodiment shown in FIG. 3, annular seal 70 is a O-ring seal; however, any annular seal suitable for the particular application may be employed. Annular seal 70 may, for example, be made of Peak® or may be of any other suitable plastic or metal seal suitable for high temperatures encountered in downhole applications. In addition, although only a single annular seal 70 is shown in the embodiment of FIG. 3, multiple seal members may be employed, such as an O-ring seal with a backup member disposed between the seal 70 and flange segment 50 of puck body 40. Such an arrangement is shown in FIG. 7.

Seal Cover

Referring again to FIG. 3, seal cover member 80 is shown. In this embodiment, cover member 80 is in the form of a ring having generally inner and outer planar surfaces 82, 84 and a central opening 86 extending therebetween. Surface 82 faces and engages shoulder 62 and, when cover 80 is positioned on body 40, intermediate body segment 54 extends through the cover opening 86. Body segment 54 functions generally to center cover 80 on puck body 40. In this embodiment, the outermost diameter of cover 80 is generally the same as the outer diameter of flange segment 50. In this manner, a seal gland 72 is formed between cover 80, sealing surface 53, shoulder 60, and perimeter sidewall 21.

Figure 5A:
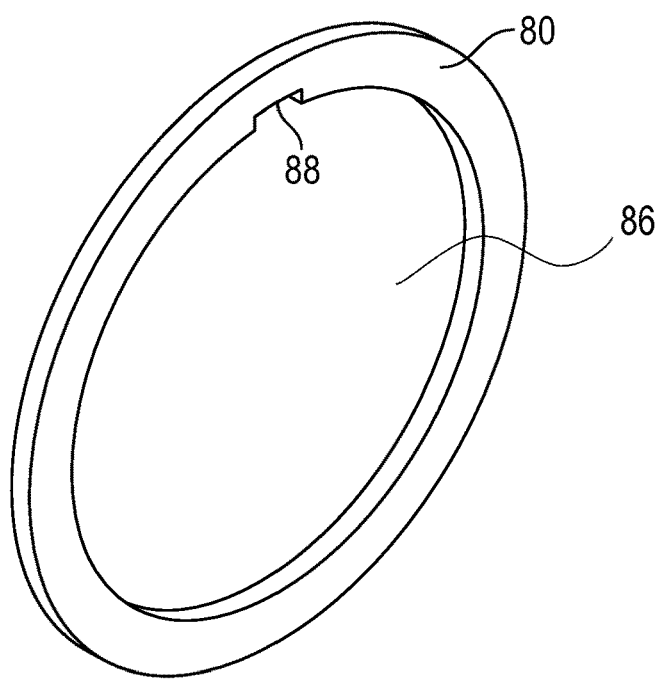
FIG. 5A is a perspective view of an annular plate or ring member that is part of the retention system shown in FIG. 3
Figure 5B:
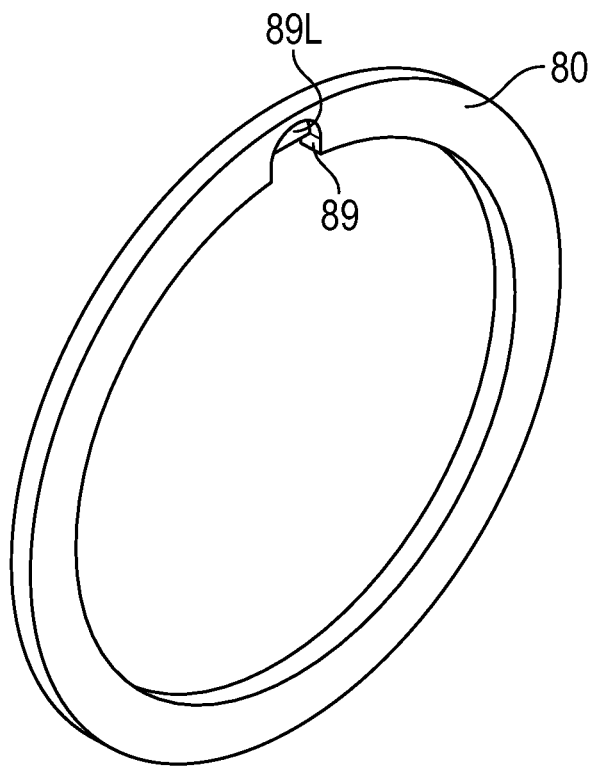
FIG. 5B is a perspective view of another annular plate or ring member that may be employed as part of the retention system shown in FIG. 3.

Referring now to FIGS. 5A and 5B, exemplary embodiments of seal cover members 80 are shown to include at least one discontinuity 88, 89 formed along the edge that defines cover opening 86. Because puck 30 is exposed to drilling mud and other borehole fluids, puck 30, cover 80, and other components positioned within tool recess 19 can become caked with mud or other debris that arises during the drilling process. Discontinuity 88, 89 supplies a tool-engaging feature allowing service personnel to insert a screwdriver, pick, or other tool so as to pry the cover 80 away from puck body 40 after service. In the embodiment of FIG. 5A, the discontinuity 88 is a generally-rectangular cutout or notch formed in inner circumferential surface 82. The notch includes an internal ledge (not visible in FIG. 5A) under which a pry tool may engage, In the embodiment shown 5B, the discontinuity includes a rounded cutout or notch 89. Notch 89 is shown to include an internal ledge 89L covering a portion of the cutout, the ledge 89L being a structure under which a pry tool may be engaged. Although only one notch or discontinuity is shown in each of FIG. 5A in FIG. 5B, two or more such discontinuities may be included in a cover 80.

Retainer

Figure 6:
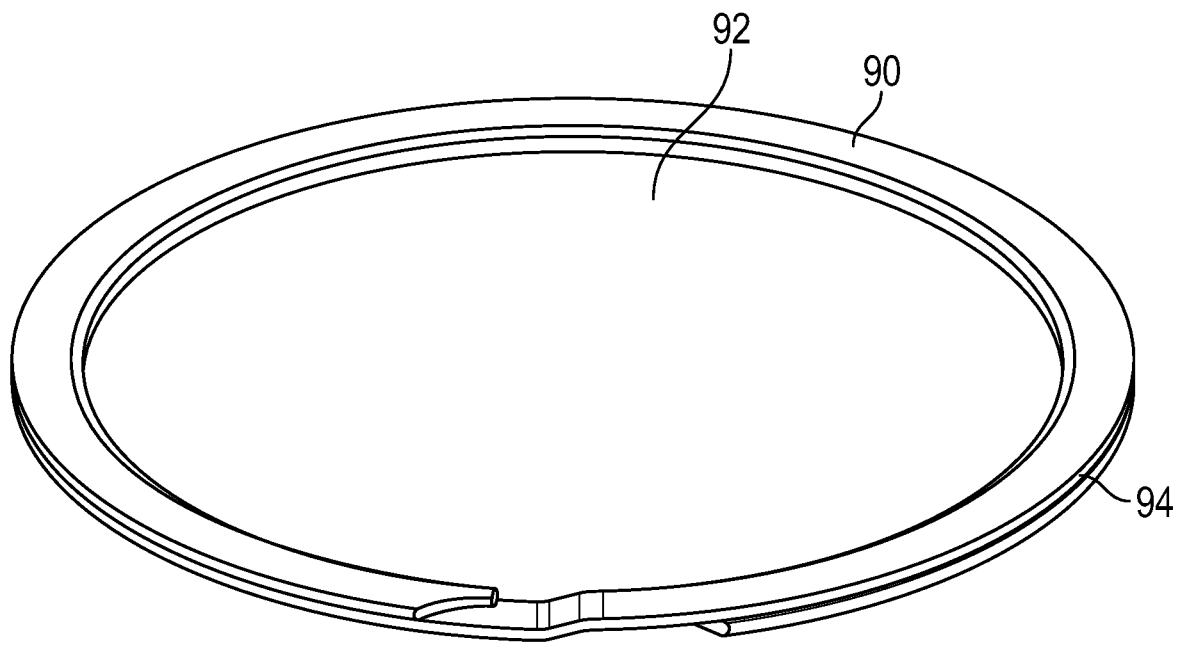
FIG. 6 is a perspective view of a retainer that is part of the retention system shown in FIG. 3.

An annular retainer 90, best shown in FIGS. 3 and 6, is employed so as to secure cover number 80 and puck 30 within the tool recess 19 once puck 30, seal member 70, and cover member 80 have all been positioned within the recess. Annular retainer 90 includes a central opening 92 sized so as to receive end segment 56 of puck body 40, and includes an outer circumferential edge surface 94. End segment 56 may extend either entirely through or only partially through opening 92. In the embodiment shown, annular retainer 90 is a "spring-loaded" retaining ring which is actionable between a compressed state, in which the retainer has a smaller overall outer diameter, to an expanded state, in which retainer has a larger outer diameter. In this embodiment, annular retainer 90 is a ring structure such as a Spirolox® DNH retaining ring manufactured by Smalley USA, 550 Oakwood Road, Lake Zürich, IL 60047. Various other retaining rings can be employed other the above-identified Spirolox ring, as well as other retainers that are not spring-loaded rings.

Installation Method

The installation and securing of puck 30 in recess 19 is accomplished as follows. Referring initially to FIG. 7, puck 30 is disposed within recess 19 of tool 17 such that flange segment 50 of puck 30 rests against ledge 23. Annular O-ring seal 70 is disposed within the recess 19 and is initially positioned generally about body segment 54 of the puck. An installation tool 100 having an annular extension 102, best shown in FIG. 7, is used to engage the seal 70. The end 104 the annular extension 102 includes a recess or groove which is contoured so as to generally match the outer curvature of seal number 70. With the annular extension 102 pointing toward recess bottom surface 20 and engaging the seal 70, the seal is pushed down past shoulder 62 on the puck body 40 so as to become positioned about sealing surface 53 of seal-engaging segment 52. The chamfer 63 facilitates the seal 70 being stretched and pushed over shoulder 62 into this position. When desired, before annular seal 70 is positioned, a backup seal member 74 may first be inserted within seal gland 72 before seal 70 is installed. Once annular seal 70 is in position about sealing surface 53, the installation tool 100 is then removed from the recess.

Figure 8:
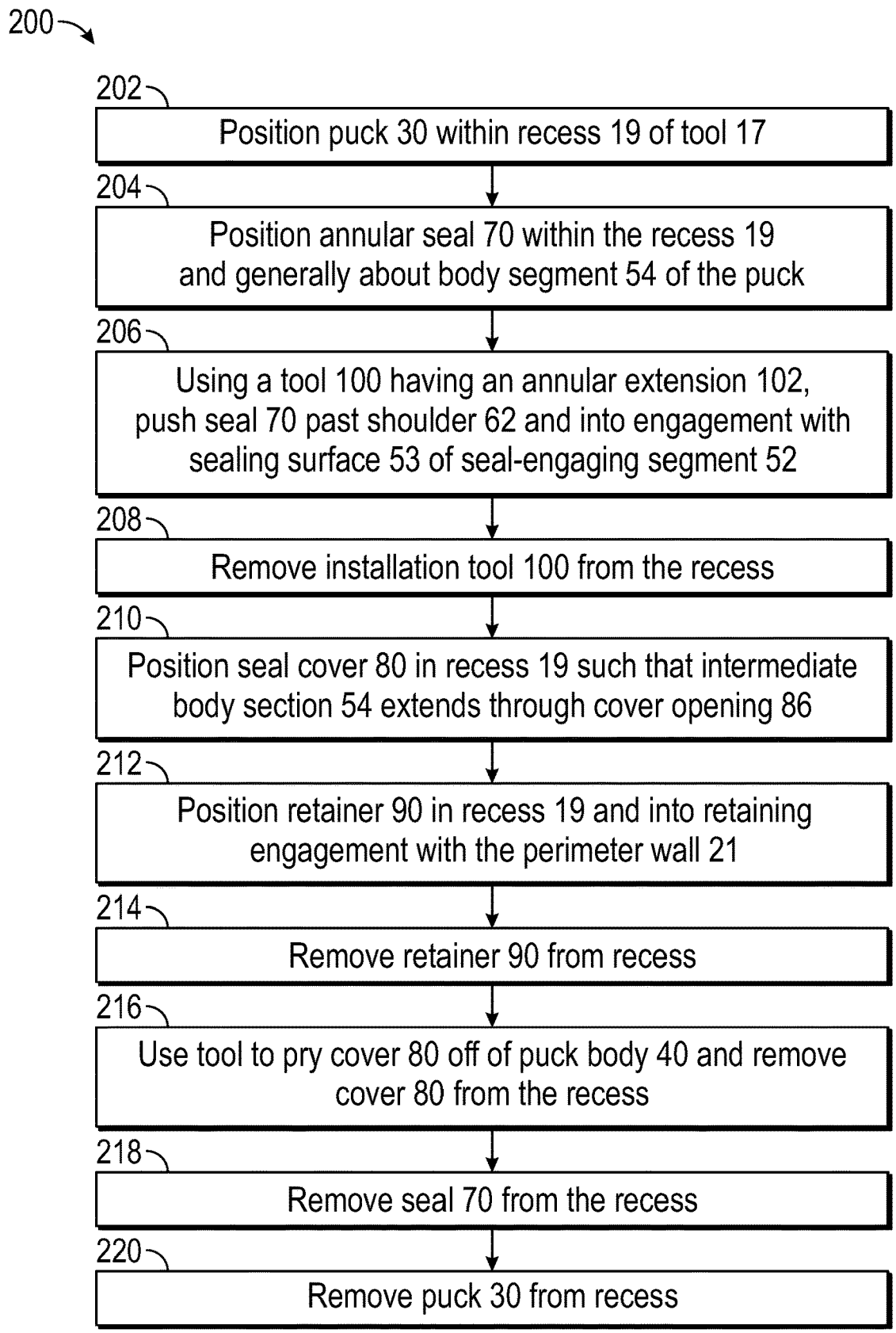
FIG. 8 is a flow diagram outlining certain of the methods disclosed herein.

Referring to FIGS. 3 and 8, the seal cover 80 is then positioned in recess 19 such that intermediate body section 54 extends through cover opening 86, and such that cover 80 rests against shoulder 62. Retainer 90 is then actuated into its reduced diameter configuration and it is disposed within recess 19 such that its outermost edge 94 is aligned with groove 24 of the perimeter wall 21 of the recess, and with the puck's end body segment 56 extending into retainer opening 92. Next, retainer 90 is actuated so as to return it to its relaxed state in which its overall outer diameter is larger than the diameter of the bottom of groove 24 such that edge 94 presses against and thereby engages the perimeter wall of the recess. In this position, retainer 90 supplies an axial force against cover 80 and puck 30 so as to retain those components within recess 19 during transportation and handling of tool 17. Once puck 30 is retained in the recess and the tool is disposed in a downhole application, the pressures exerted downhole are alone more than sufficient to retain the puck 30 sealed in the recess. As such, the annular retainer 90 is employed merely to keep puck 30 in position when the tool is not downhole, such as when the tool is being transported or being inspected or serviced before or after a downhole run.

The installation method 200 of sealing and retaining puck 30 in recess 19 may further be described with reference to FIG. 8. In step 202, puck 30 is positioned within recess 19 of tool 17. According to step 204, annular O-ring seal 70 is disposed within the recess 19 and is initially positioned generally about body segment 54 of the puck. According to step 206, using a tool 100 having an annular extension 102, the seal 70 is pushed down past shoulder 62 on the puck body 40 so as to become positioned about sealing surface 53 of seal-engaging segment 52. In step 208, the installation tool 100 is then removed from the recess. In step 210, seal cover 80 is positioned in recess 19 such that intermediate body section 54 extends through cover opening 86, and such that cover 80 rests against shoulder 62. In step 212, retainer 90 is positioned in recess 19 and actuated so as to engage the perimeter wall 21 and secure puck 30, cover 80 and seal 70 in recess 19.

A method of removing the puck from recess 19 after a run includes step 214, in which the retainer 90 is removed. Then in step 216, a tool is used to pry cover 80 off of puck body 40 and cover 80 is removed from the recess. In step 218, the seal 70 is removed from the recess and, in step 220, puck 30 is removed.

Additional Information

The puck and retention embodiments and methods described above advance the state of the art. In typical conventional designs, the puck structure did not permit the seal to be installed about the puck after the puck was already installed in the tool pocket. The typical such pucks included a pair of seal-retaining rims or flanges that had the same outer diameter and extended to an extent so as to be very close to the pocket's side wall. The seal was captured between the two flanges. Given this structure, it was a requirement that the seal be installed about the puck before the puck was installed in the tool pocket. When such a puck was then installed into the pocket, the seal tended to trap air beneath the puck. This did not pose a significant impediment with larger pucks as they could be formed with external threads that would match and mate with a threaded segment formed in the pocket walls. Such threaded engagements provided an easy and reliable source of mechanical advantage as useful to provide an installation and holding force.

However, there is presently a need for much smaller pucks, such pucks and their receiving pockets in the tool not having sufficient room in which to form and utilize threaded connections, while still maintaining a desired orientation of the puck within the tool pocket. Further, with the convention design, the trapped air is significantly compressed as the puck is threaded into engagement. This urges the puck to "pop out" until some type of retaining device is installed. Therefore, installation was awkward and could be difficult as an external installation force was required to compress the air and retain the puck in positions for the time it took to install the retention mechanism. In addition, upon removal of the conventional puck after a run, the lack of threads on the smaller designs meant that a removal force had to be externally applied, but with no threads to offer a mechanical advantage, and very little space on the puck's outer surface to add features (e.g. threads, lips) to which to a removal tool/mechanism could be attached, this was problematic. Some conventional designs had included small threaded holes but those tended to pack off easily with drilling mud. Further, a careful and thorough cleaning of the puck and pocket was often required in order to ultimately remove the puck.

Embodiments disclosed herein alleviate installation and removal difficulties experienced with prior designs. For example, as shown in FIGS. 3 and 7, because puck body 40 does not include a pair of seal-retaining flanges of equal diameter, with the seal captured therebetween, seal 70 and its cover 80 can be installed and removed separately from puck 30. This allows the puck 30 to be installed in the downhole tool 17 first, without seal 70 pre-installed. In turn, this allows the air in the pocket 19 to escape. Further, as compared to threaded conventional designs, the designs described herein allow puck 30 to be more easily aligned with any clocking feature of the pocket 19, an accomplishment sometime difficult when a puck must be threaded to the extent that it reaches a secure position. Additionally, employing a puck and tool recess that do not require a threaded connection saves manufacturing steps and time.

Further, it is beneficial and important for the O-ring 70 to be stretched evenly as it is inserted about the puck body 40, so annular extension 102 of tool 100 is provided and sized to fit in the very small gap between the puck body 40 and the perimeter wall 21 of recess 19. To further facilitate proper O-ring installation with the O-ring 70 stretched evenly as it is installed about body 40, the end 104 of extension 102 is cupped or grooved to conform to the radius of the O-ring's outer surface. This feature also helps to insert the O-ring 70 with precision and with even degree of stretch, and requires that only a minimal force be employed.

Post run, the embodiments and methods disclosed here provide a much easier removal procedure. Once the retainer 90 is removed, a pry tool such as a flat head screw driver can be inserted into the notch or other discontinuity 88, 89 formed on the cover ring 80 such that it is easily pried off. Then, the O-ring 70 can be either cut, stabbed with a pick, or otherwise removed from recess 19 in tool 17. The puck 30 is then free to be easily removed from the recess 19. Any drilling mud on the ID of the recess 19 can be easily wiped away at this point, such that the force then required for puck removal is very small.

While various exemplary embodiments of the invention have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to merely reference such steps subsequently in the claim. Unless otherwise specified within a claim, the order of steps in a claim may be performed in any order.

What is claimed is:

1. A downhole tool configured to be disposed in a borehole having borehole fluids, the tool comprising:
    a tool body comprising an outer surface configured for exposure to borehole fluids and a recess in the outer surface, the recess including a perimeter wall and a recess opening;
    an electronics module positioned in the recess, the module comprising a body housing electronic devices that are retained within a cavity internal to the body, and wherein the module body comprises:
        a flange segment having a first outer diameter;
        a seal-engaging segment having an outer diameter that is less than the outer diameter of the flange segment; and
        a first annular shoulder between the flange segment and the seal-engaging segment;
    a retainer positioned adjacent to the recess opening and comprising a wall-engaging outer surface configured to selectively engage and disengage the perimeter wall of the recess; and
    an annular seal disposed about the seal-engaging segment between the retainer and the first annular shoulder of the module body and sealing between the module body and the perimeter wall of the recess;
    an intermediate segment, an end segment, and a second annular shoulder between the intermediate segment and the seal engaging segment; the downhole tool further comprising:
    an annular cover axially spaced from the retainer and engaging the second annular shoulder and comprising a cover opening, wherein the intermediate segment of the module body extends through the cover opening, and wherein the retainer is positioned between the recess opening and the cover.

2. The downhole tool of claim 1 wherein the retainer further comprises a retainer opening, and wherein the end segment of the module body extends into the retainer opening.

3. The downhole tool of claim 1 wherein the retainer is a spring-loaded retaining ring.

4. The downhole tool of claim 1 wherein the perimeter wall of the recess includes an annular groove, and wherein the wall-engaging outer surface of the retainer is disposed in the annular groove.

5. The downhole tool of claim 1 wherein the cover opening is defined by a circumferential edge, and wherein the edge comprises one or more tool receiving features.

6. The downhole tool of claim 1 wherein the module body is threadless on its outer surface.

7. The downhole tool of claim 1 wherein the outer diameter of the retainer exceeds the outer diameter of the first annular shoulder and exceeds the outer diameter of the cover.

8. The downhole tool of claim 1 wherein the retainer is in engagement with the cover.

9. The downhole tool of claim 1 wherein a seal gland is defined by the cover, the seal-engaging segment, the flange segment, and the perimeter wall of the recess, and wherein a back up annular member is positioned in the seal gland between the first annular shoulder and the annular seal.

10. The downhole tool of claim 1 wherein the intermediate segment has an outer diameter that is less than the outer diameter of the seal-engaging segment, and wherein the end segment has an outer diameter that is less than the outer diameter of the intermediate segment.

11. The downhole tool of claim 10 wherein the wherein the module body further comprises a third annular shoulder between the intermediate segment and the end segment and wherein the retainer is in engagement with the third annual should.

12. The downhole tool of claim 11 wherein the retainer is a spring-loaded retaining ring having a retainer opening, and wherein the retainer opening has a diameter that is less than the outer diameter of the intermediate segment and is greater than the outer diameter of the end segment.

13. The downhole tool of claim 11 wherein the retainer has an outer diameter that is greater than the outer diameter of the cover.

14. A method of installing or removing an electronics module within a recess formed in a downhole tool, wherein the downhole tool includes an outer surface and wherein the recess is formed in the outer surface and includes a perimeter wall and a recess opening, the method comprising:
    positioning the module in the recess;
    positioning an annular seal about the module after the module is positioned in the recess;
    after positioning the annular seal about the module, positioning a cover having a cover opening within the recess such that a segment of the module extends through the cover opening;
    after positioning the cover, positioning within the recess a retainer such that the outer surface of the retainer releasably engages the perimeter wall of the recess.

15. The method of claim 14 wherein positioning an annular seal about the module is performed using a tool having an annular extension, the annular extension being used to press the annual seal in a direction away from the recess opening and into sealing engagement with the perimeter wall of the recess and the module.

16. The method of claim 14 wherein the retainer is a spring loaded ring, and wherein the positioning of the retainer in the recess comprises actuating the ring to cause the ring to expand from a compressed position to an expanded position, the outer edges of the ring engaging the perimeter wall of the recess upon expansion of the ring.

17. The method of claim 14 further comprising:
removing the retainer from the recess; and
using a tool, engaging a tool-engaging feature of the cover with the tool and prying a segment of the cover away from the module.

18. A downhole tool configured to be disposed in a borehole having borehole fluids, the tool comprising:
a tool body comprising an outer surface configured for exposure to borehole fluids and a recess in the outer surface, the recess including a perimeter wall and a recess opening;
an electronics module positioned in the recess, the module comprising a body housing electronic devices that are retained within a cavity internal to the body, and wherein the module body comprises:
a flange segment having a first outer diameter;
a seal-engaging segment having an outer diameter that is less than the outer diameter of the flange segment; and
a first annular shoulder between the flange segment and the seal-engaging segment;
a retainer comprising a retainer opening and a wall-engaging outer surface configured to selectively engage and disengage the perimeter wall of the recess; and
an annular seal disposed about the seal-engaging segment between the retainer and the first annular shoulder of the module body and sealing between the module body and the perimeter wall of the recess;
an intermediate segment, an end segment extending into the retainer opening, and a second annular shoulder between the intermediate segment and the seal engaging segment;
the downhole tool further comprising:
an annular cover engaging the second annular shoulder and comprising a cover opening, wherein the intermediate segment of the module body extends through the cover opening.

19. The downhole tool of claim 18 wherein the module body is threadless on its outer surface.

20. The downhole tool of claim 18 wherein the retainer is a spring-loaded retaining ring.

21. The downhole tool of claim 18 wherein the retainer has an outer diameter that is greater than the outer diameter of the cover.

22. The downhole tool of claim 20 wherein the outer diameter of the retainer exceeds the outer diameter of the first annular shoulder and exceeds the outer diameter of the cover.

* * * * *